(12) United States Patent
Takahagi et al.

(10) Patent No.: US 6,371,879 B1
(45) Date of Patent: Apr. 16, 2002

(54) AUTOMATIC TRANSMISSION CONTROL UNIT

(75) Inventors: Naoya Takahagi, Iwaki; Hiroshi Kuroiwa, Hitachi, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/576,818

(22) Filed: May 24, 2000

(30) Foreign Application Priority Data

May 26, 1999 (JP) .......................................... 11-146120

(51) Int. Cl.$^7$ .............................................. F16H 31/00
(52) U.S. Cl. ...................... 475/116; 477/154; 477/156; 475/118; 475/120; 475/125
(58) Field of Search .................. 475/116, 118, 475/720; 477/115, 120, 121, 143, 154

(56) References Cited

U.S. PATENT DOCUMENTS 5,865,708 A * 2/1999 Nishio et al. ................ 477/155
5,931,885 A * 8/1999 Kubo et al. ................... 701/51
6,128,565 A * 10/2000 Tsutsui et al. ................ 701/51

FOREIGN PATENT DOCUMENTS

| JP | 10-47465 | 2/1998 |
| JP | 10-184882 | 7/1998 |

* cited by examiner

*Primary Examiner*—Sherry Estremsky
*Assistant Examiner*—Tisha D. Lewis
(74) *Attorney, Agent, or Firm*—Crowell & Moring LLP

(57) ABSTRACT

Torque phase detecting means 110 detects the starting point of a torque phase in an automatic transmission. Racing detecting means 120 detects a racing. Control means 140 shifts disconnecting or connecting hydraulic pressure or timing in the next automatic transmission according to whether the racing means 120 occurred before or after the starting point of a torque phase detected by said torque phase detecting means 110. An automatic transmission control unit which suppresses racing without giving any shock to the driver can be obtained.

7 Claims, 11 Drawing Sheets

AUTOMATIC TRANSMISSION CONTROL UNIT

BACKGROUND OF THE INVENTION

The present invention relates to an automatic transmission control unit and more particularly to an automatic transmission control unit for an automobile which transmits the driving force from an engine to axles.

A conventional automatic transmission control unit has been used by an automobile having a system which automatically changes the revolutions per minute (rpm) of the engine while transmitting the driving power to the axle. Further, to optimize transmission time, the automatic transmission control unit controls forces working on friction members according to the running status of the automobile. Substantially, the conventional automatic transmission control unit controls the hydraulic pressures working on the engaging and disengaging friction members at a suitable timing.

The conventional automatic transmission control unit determines the disconnecting timing and hydraulic pressure just before the racing. However, because of manufacturing tolerances of products, it has frequently occurred that, when the actual disconnecting hydraulic pressure is lower than the instructed value, a racing occurs and the friction members are quickly damaged.

To eliminate this problem, for example, Japanese application patent laid-open publication No. Hei 10-47465 (1998) has disclosed a method of preventing racings of the engine by increasing the disconnecting hydraulic pressure when detecting a racing. For another example, Japanese application patent laid-open publication No. Hei 10-184882 (1998) has disclosed a method of preventing racings of the engine by increasing the connecting hydraulic pressure when detecting a racing.

The systems disclosed in the above stated Japanese application patent laid-open publication Nos. Hei 10-47465 (1998) and Hei 10-184882 (1998) singly increase the disconnecting or connecting hydraulic pressure when detecting the racing. Therefore, if the actual hydraulic pressure goes higher than the instructed value, the driver may feel a comparatively great pullback shock or abrupt kickback.

SUMMARY OF THE INVENTION

The main object of the present invention is to provide an automatic transmission control unit which detects and reduces racings for smooth and shockless transmission.

(1) The present invention relates to a control unit for controlling an automatic transmission system of an automobile which transmits a driving power from the output shaft of the engine to the transmission system through friction members, controls to disconnect and link together said friction members, and controls gear ratios of said transmission.

In order to realize the above object according to the present invention, the automatic transmission control unit in accordance with the present invention comprises means for detecting a starting point of a torque phase of said transmission, means for detecting a racing of the engine is racing, and control means which changes the disconnecting or connecting hydraulic pressure or timing in the next and later transmission according to whether the racing detected by said racing detecting means is before or after the torque phase starting point which is detected by said torque phase detecting means.

When detecting a racing, this configuration checks whether the racing occurs before or after the torque phase starting point and controls the disconnecting or connecting hydraulic pressure or timing according to it. This can reduce racings and provide smooth and shockless transmission.

(2) Preferably in (1), said control means is designed to increase the disconnecting hydraulic pressure in the next transmission when the racing detected by said racing detecting means is before the torque phase starting point which is detected by said torque phase detecting means.

(3) Preferably in (1), said control means is designed to increase the connecting hydraulic pressure in the next transmission when the racing detected by said racing detecting means is after the torque phase starting point which is detected by said torque phase detecting means.

(4) Preferably in (1), said control means is designed to delay the disconnecting timing in the next transmission when the racing detected by said racing detecting means is before the torque phase starting point which is detected by said torque phase detecting means.

(5) Preferably in (1), said control means is designed to advance the disconnecting timing in the next transmission when the racing detected by said racing detecting means is after the torque phase starting point which is detected by said torque phase detecting means.

(6) Preferably in (1), said control means is designed to reduce the disconnecting hydraulic pressure in the next transmission when said racing detecting means detects no racing.

(7) Preferably in (1), said control means is designed to advance the disconnecting timing in the next transmission when said racing detecting means detects no racing.

DESCRIPTION OF THE INVENTION

An automatic transmission control unit which is a first embodiment of the present invention will be described in detail below, referring to drawings FIG. 1 through FIG. 11.

Figure 1:
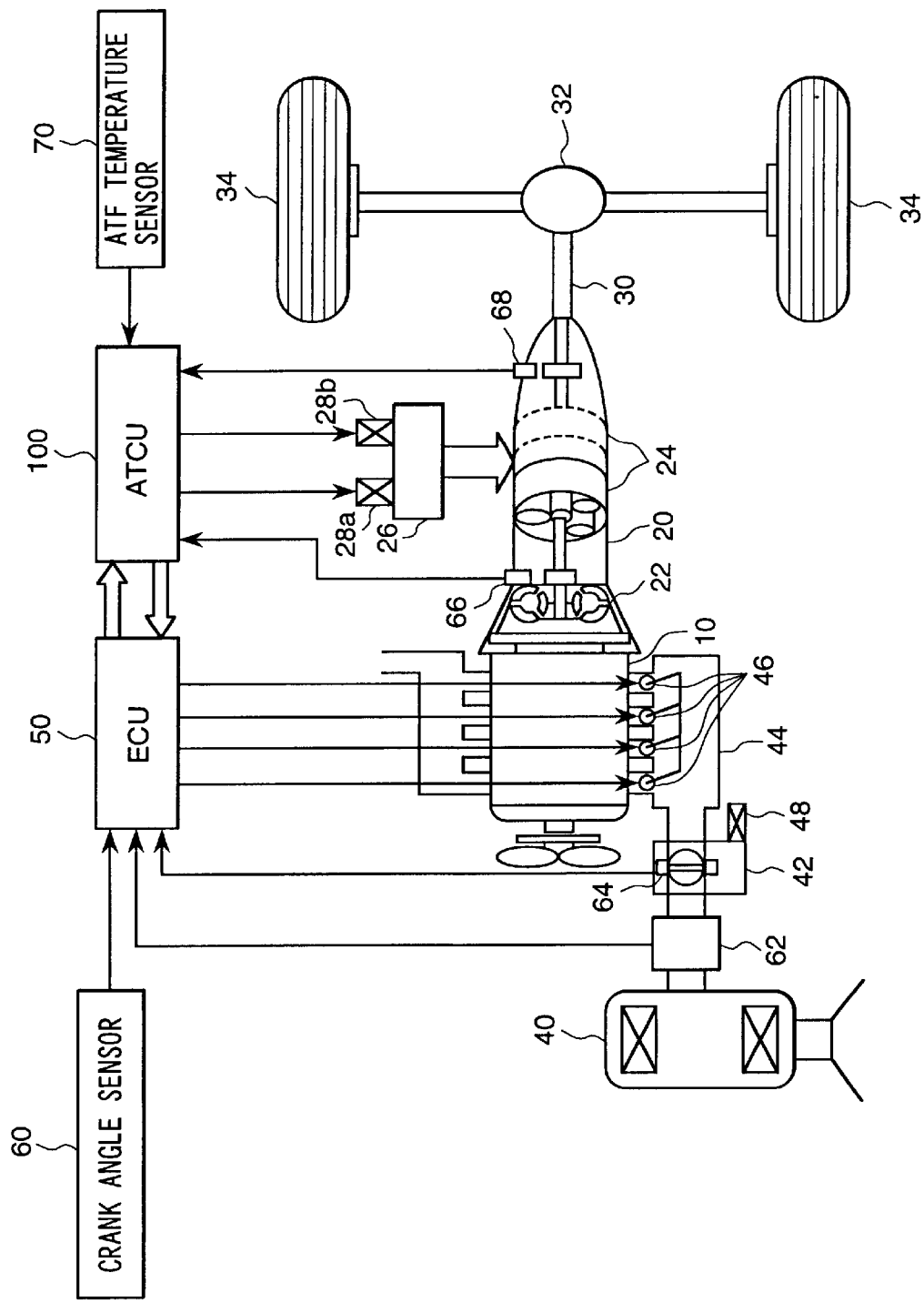
FIG. 1 is a schematic block diagram of an automobile using an automatic transmission control unit which is a first preferred embodiment of the present invention.

FIG. 1 is a schematic diagram of a transmission system of an automobile using an automatic transmission control unit in accordance with the present invention.

The driving force of an engine 10 is transmitted to a rear axle 34 through an automatic transmission (AT) 20, a propeller shaft 30 and a differential unit 32 which also works as a final reduction gear. The automatic transmission (AT) 20 automatically changes the revolutions per minute (rpm).

The automatic transmission (AT) 20 internally comprises a torque converter 22 and a gear train 24. The automatic transmission (AT) 20 is controlled by an electronically automatic transmission control unit (ATCU) 100 containing a microcomputer. The automatic transmission control unit (ATCU) 100 controls the automatic transmission (AT) 20 through hydraulically controlled solenoid valves 28.

The quantity of air taken from an air cleaner 40 is controlled by the throttle controller 42. The intake manifold 44 contains injectors 46 which inject fuel to the in-taken air.

An electronic engine control unit (ECU) 50 containing a microcomputer receives sensor information from sensors such as a crank angle sensor 60, an air flow sensor 62 which detects the quantity of intake air, a throttle sensor which is mounted on the throttle controller 42, a sensor for detecting the temperature of engine coolant (which is not shown in FIG. 1), a sensor for sensing the concentration of oxygen in exhaust gas in the exhaust pipe, an exhaust temperature sensor, performs operations (rpm of the engine, etc.), and outputs a valve opening signal to the injector 46 to control the quantity of fuel.

Further, the electronic engine control unit (ECU) 50 performs other control operations such as outputting a valve opening signal to the idling speed control valve (ISC) 48 to control the quantity of auxiliary air, outputting ignition signals to ignition plugs (which is not shown in FIG. 1) to control ignition timing, and so on.

The automatic transmission control unit (ATCU) 100 receives sensor information from sensors such as a turbine sensor 66 which detects the revolutions per minute (rpm) of the turbine, a vehicle speed sensor 68 which detects the rpm of the output shaft of the automatic transmission (AT) 20, and an automatic transmission fluid (ATF) sensor 70 and signals such as the rpm of the engine and throttle openings from the electronic engine control unit (ECU) 50 and performs operations.

The automatic transmission control unit (ATCU) 100 selects an optimum gear and outputs a valve opening signal to a change-over solenoid valve 28a which is mounted on a hydraulic circuit 26. The automatic transmission control unit (ATCU) 100 also outputs a control signal to a control solenoid valve which controls a line pressure PL which works to connect the friction members. The automatic transmission control unit (ATCU) 100 is equipped with an automatic transmission control unit in accordance with this embodiment.

The aforesaid embodiment employs a method of directly detecting the quantity of air which is taken in by the engine by an airflow sensor 62. However, this embodiment is intended to illustrate the invention and is not to be construed to limit the scope of the invention and variations may be made by one skilled in the art without departing from the spirit and scope of the invention.

For example, the embodiment can employ any of a method of calculating the quantity of intake air from the air pressure in the intake manifold 44 and the temperature of the intake air, a method of calculating the quantity of intake air from the throttle opening and rpm of the engine, and so on.

Further, the automatic transmission control unit (ATCU) and the electronic engine control unit (ECU) in this embodiment are provided separately but this is not to be construed to limit the scope of the invention. The automatic transmission control unit (ATCU) and the electronic engine control unit (ECU) can be provided in a body.

Furthermore, this embodiment uses a vehicle of the front-engine and rear-drive type. However, this vehicle type is intended to illustrate the invention and is not to be construed to limit the scope of the invention and variations may be made by one skilled in the art without departing from the spirit and scope of the invention.

For example, the vehicle type can be a front-engine and rear-drive type, a front-engine and front-drive type, a rear-engine and rear-drive type, or a four-wheel drive type.

Figure 2:
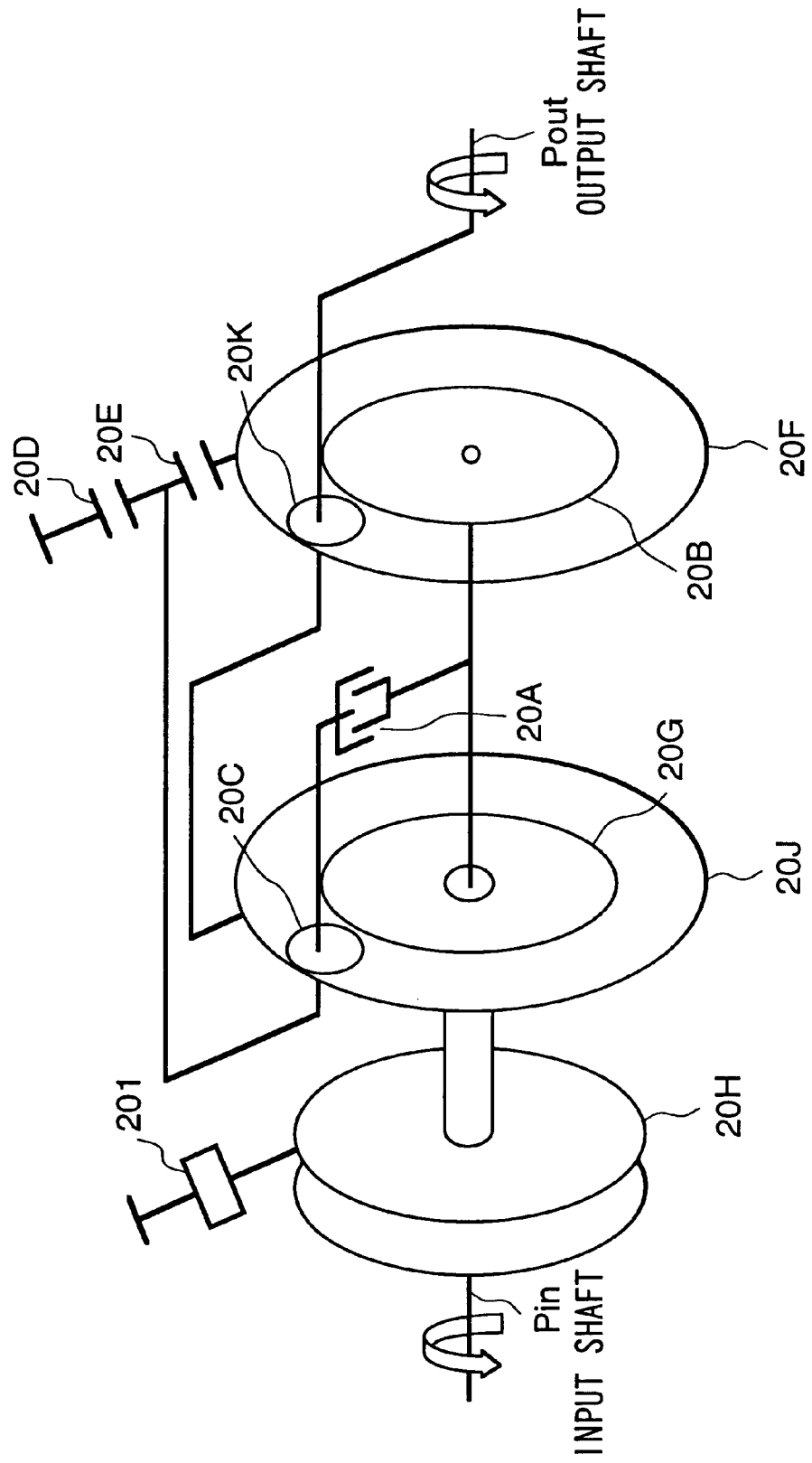
FIG. 2 is a schematic diagram of the gear configuration of an automatic transmission which is a first preferred embodiment of the present invention.

Referring to FIG. 2, below will be explained the gear configuration of the automatic transmission in accordance with the present invention.

FIG. 2 is a schematic diagram of the automatic transmission in accordance with the first embodiment of the present invention.

FIG. 2 shows the configuration of a basic forward 4-speed transmission, excluding the backward clutch and the engine braking clutch. This transmission contains two sets of planetary gears and four friction members.

A high clutch 20A and the rear central gear (the sun gear) 20B are connected to the input shaft Pin of the automatic transmission (AT) 20. Opposite to the high clutch 20A are connected a front pinion gear 20C, a low one-way clutch 20D, and a forward one-way clutch 20E. When a positive torque (in the rotational direction of the input shaft) generates, the low one-way clutch 20D links together, which consequently stops the rotation of the shaft.

The opposite side of the forward one-way clutch 20E is connected to the rear internal gear. The front sun gear 20G is connected to the brake drum 20H. When the band brake 20I is connected, the brake drum 20H stops revolving. The front internal gear 20J is connected to the rear pinion 20K and the output shaft Pout.

Friction members are connected or disconnected as shown below according to gear positions. See Table 1.

TABLE 1

| Gear position | Band brake | Clutch | | |
|---|---|---|---|---|
| | | Low one-way clutch | High clutch | Forward one-way clutch |
| 1st speed | x | o | x | o |
| 2nd speed | o | x | x | o |
| 3rd speed | x | x | o | o |
| 4th speed | o | x | o | x | o: Connected
x: Disconnected

Figure 3:
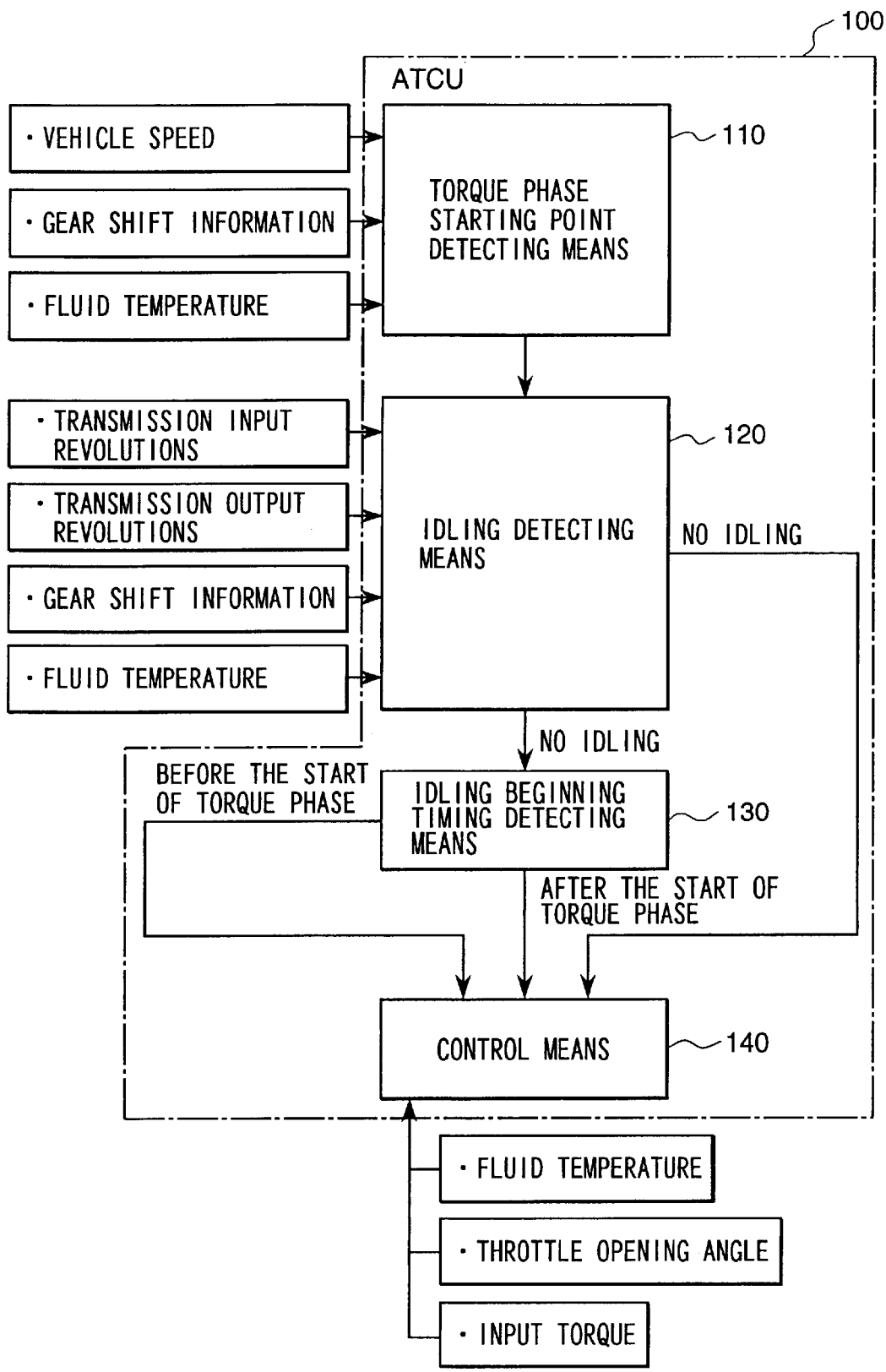
FIG. 3 is a block diagram of an automatic transmission control unit which is a first preferred embodiment of the present invention.

Referring to FIG. 3, below will be explained the control unit of the automatic transmission in accordance with the present invention.

FIG. 3 is a functional block diagram of the automatic transmission control unit in accordance with the first embodiment of the present invention.

The automatic transmission control unit which is the first embodiment of the present invention is housed in the automatic transmission control unit (ATCU) 100 (see FIG. 1) and comprises means 110 for detecting a torque phase starting point, means 120 for detecting a racing, means 130 for detecting a racing timing, and a control means 140.

The means 110 for detecting a torque phase starting point receives information on the vehicle's velocity detected by the speed sensor 68, information on the temperature of fluid detected by the automatic transmission fluid (ATF) temperature sensor 70, and gear-change information which the automatic transmission control unit (ATCU) 100 retains.

The means 110 differentiates the vehicle's velocity, compares the result of differentiation by a threshold value which is calculated from the gear-change information and the fluid temperature, and determines the starting point of a gear-change torque phase. The torque-phase starting point will be explained in detail referring to FIG. 5.

The means 120 for detecting a racing receives information on the mission input rpm (revolutions per minute of the turbine) detected by the turbine sensor 66, information on the mission output rpm detected by the speed sensor 68, information on the temperature of fluid detected by the ATF temperature sensor 70, and gear-change information which the automatic transmission control unit (ATCU) 100 retains.

The means 120 calculates a gear ratio from the mission input rpm (revolutions per minute of the turbine) and the information on the mission output rpm, calculates a threshold value to identify a racing from the gear-change information and the fluid temperature, compares the calculated gear ratio by the threshold value, and thus knows whether a racing has occurred.

When a racing occurs, the means 130 for detecting a racing timing checks the timing of occurrence of the racing (or before or after the torque phase starting point which was calculated from the vehicle's velocity).

According to racing status (when the racing detecting means 120 detects no racing, when the racing timing detecting means 130 judges that a racing started before a torque phase starting point which is calculated from the vehicle's velocity, or when the means 130 judges that a racing started after a torque phase starting point which is calculated from the vehicle's velocity), the control means 140 controls the disconnecting hydraulic pressure, the connecting hydraulic pressure, disconnecting timing, and/or connecting timing. Controlling by the control means 140 will be explained later referring to FIG. 4.

Referring to FIG. 4 through FIG. 7, below will be explained the control operation of the automatic transmission control unit in accordance with this embodiment.

Figure 4:
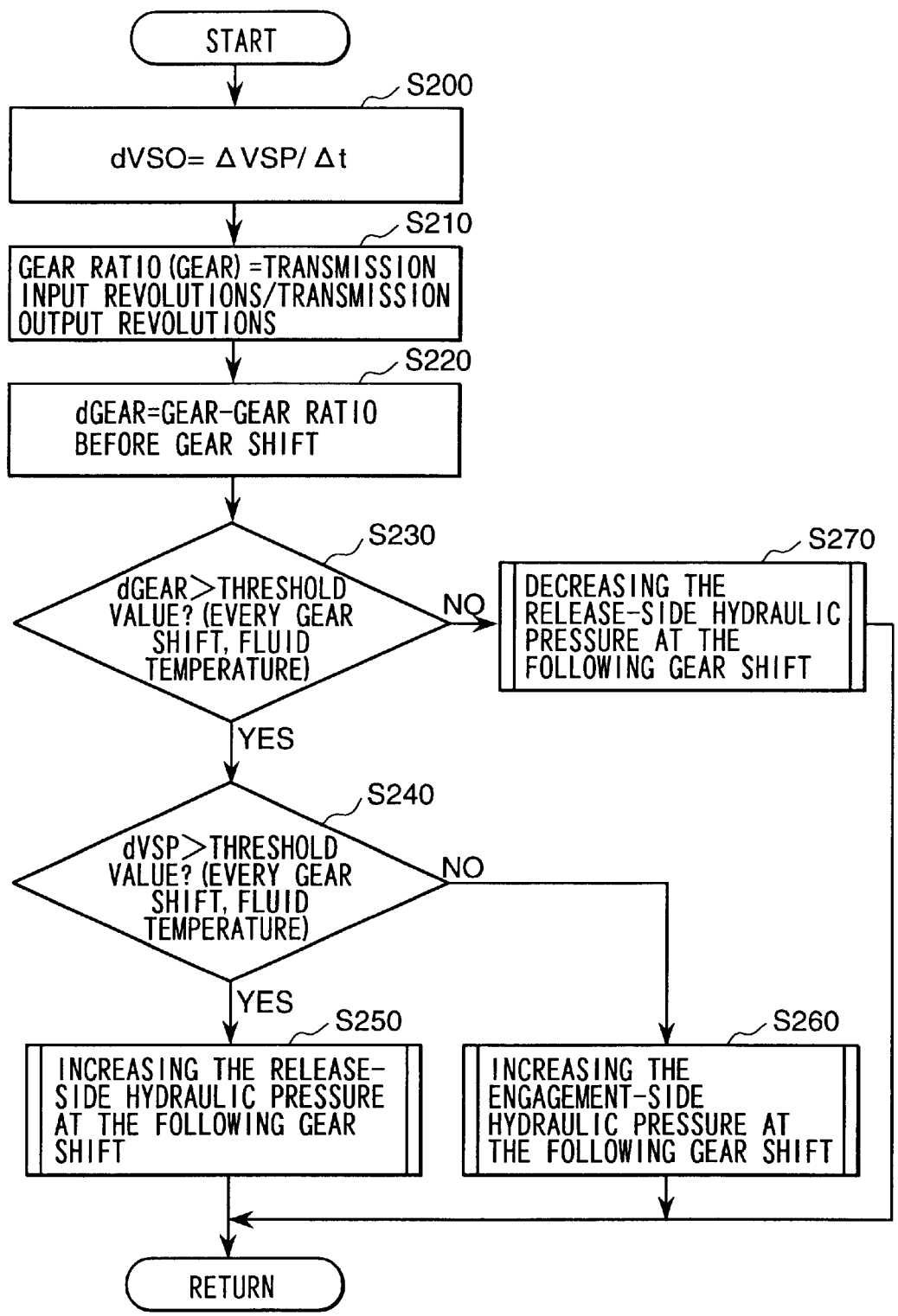
FIG. 4 is a control flowchart of an automatic transmission control unit which is a first preferred embodiment of the present invention.
Figure 5:
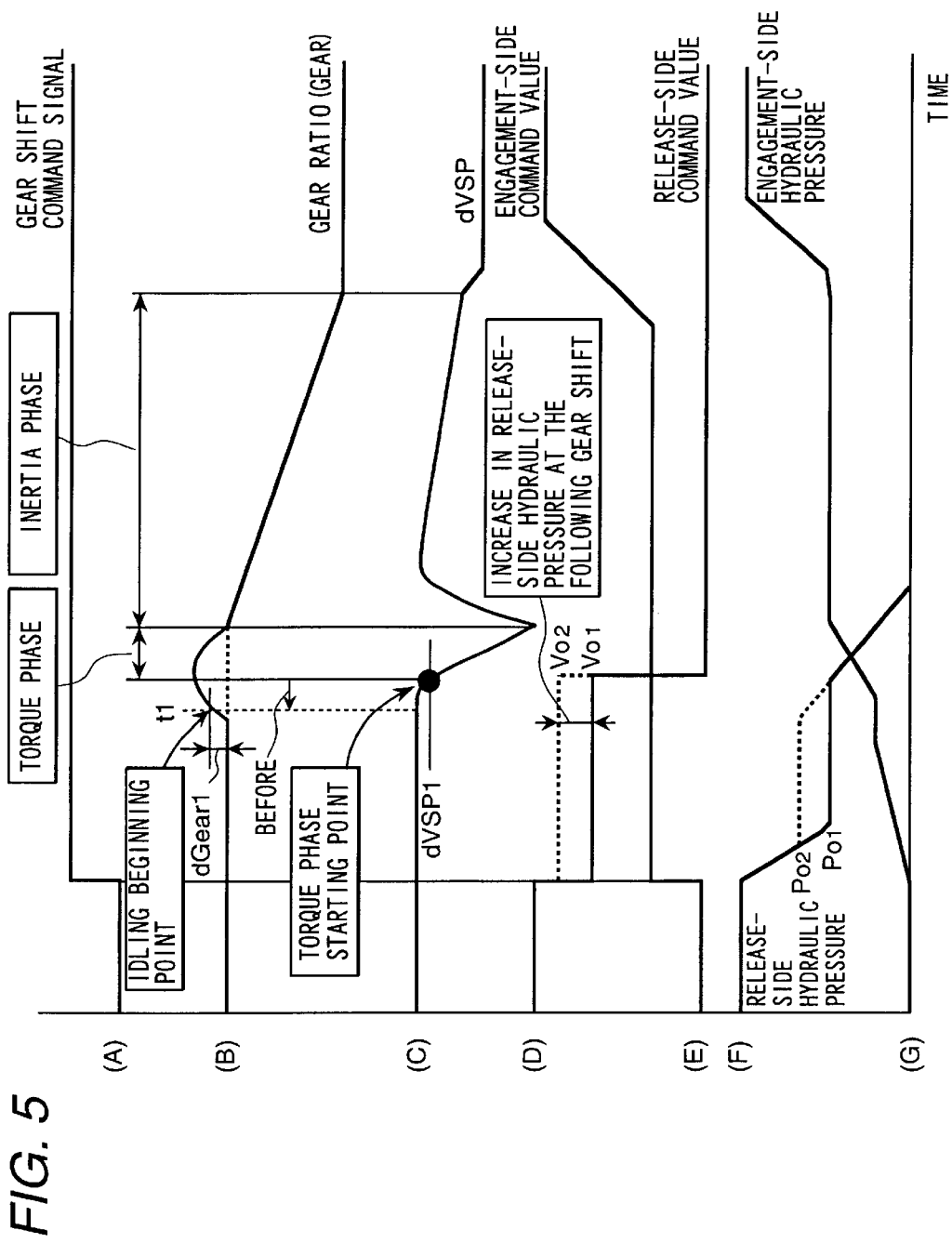
FIG. 5 is a timing chart indicating the control status of the automatic transmission control unit which is a first preferred embodiment of the present invention when a racing occurs before a torque phase starts.
Figure 6:
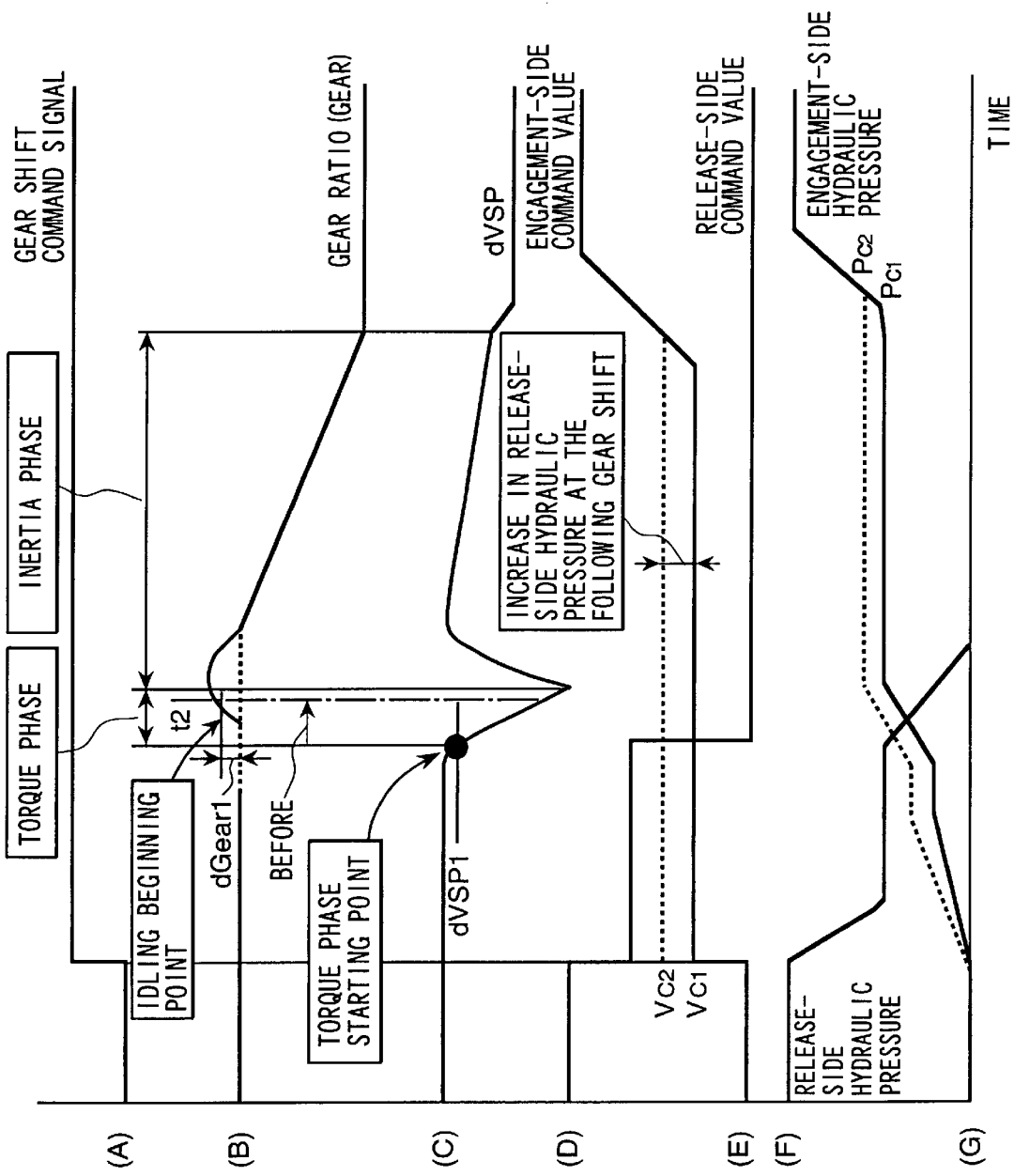
FIG. 6 is a timing chart indicating the control status of the automatic transmission control unit which is a first preferred embodiment of the present invention when a racing occurs after a torque phase starts.
Figure 7:
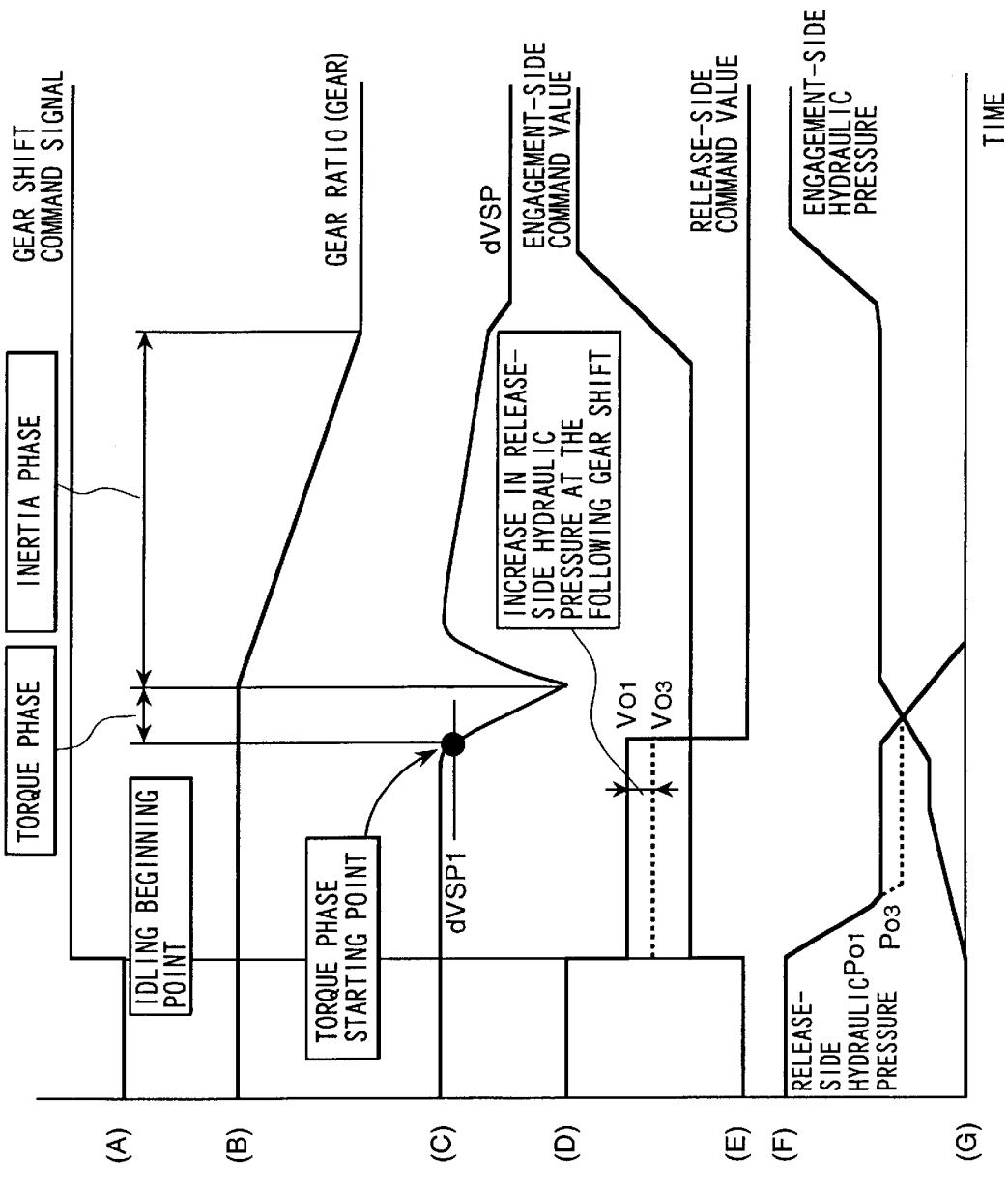
FIG. 7 is a timing chart indicating the control status of the automatic transmission control unit which is a first preferred embodiment of the present invention when a racing is not detected.

FIG. 4 is a flowchart showing a flow of control in the automatic transmission control unit in accordance with the present invention. FIG. 5 is a timing chart indicating the control status when a racing is detected before a torque phase starts. FIG. 6 is a timing chart indicating the control status when a racing is detected after a torque phase starts. FIG. 7 is a timing chart indicating the control status when no racing is detected.

In step S200 of FIG. 4, the means 110 for detecting a torque-phase starting point calculates a differential value (dVSP) of a vehicle's velocity from a transition of the vehicle's velocity (ΔVSP) in a preset time period (Δt). The differential value (dVSP) is used for judgement of the starting point of a torque phase.

Referring to FIG. 5, signals (A), (B), and (C) respectively indicate a change-gear command signal, a gear ratio (to be explained later), and a differential value (dVSP) which is obtained in step S200 in that order. At the starting point of a torque phase (in (C)), the differential value (dVSP) is equal to the threshold value (dVSP1).

In step S210, the means 120 for detecting a racing calculates a gear ratio (Gear) which is a ratio of the mission input rpm (revolutions per minute of the turbine) and the mission output rpm. The gear ratio (Gear) changes for example as shown in (B) of FIG. 5. The solid line in (B) indicates that a racing has occurred and a dotted line indicates that the racing has been eliminated and corrected.

In step S220, the means 120 calculates the duration of the racing (dGear) by subtracting the gear ratio before gear reduction from the gear ratio (Gear).

Further in step S230, the means 120 for detecting a racing obtains a threshold value (dGear1) (to be used to identify a racing) from the gear change information and the fluid temperature, compares the racing duration (dGear) by the threshold value (dGear1), and judges whether a racing has occurred.

In the example (B) in FIG. 5, it is assumed that a racing occurred at time t1 as the racing duration dGear exceeds the threshold value (dGear1). Go to step S240 when a racing occurred or to step S270 when no racing occurs.

In step S240, when a racing occurs (when the racing duration dGear exceeds the threshold value (dGear1)), the means 130 for detecting a racing timing obtains a threshold value (to be used to identify a racing) from the gear change information and the fluid temperature, compares the differential value (dVSP) by the threshold value, and judges whether a racing occurred before or after the torque phase starts.

When the racing occurs before a torque-phase starts, the system goes to step S250. Similarly, when the racing occurs after a torque-phase starts, the system goes to step S260. In the example (C) in FIG. 5 having a threshold value dVSP1, the system assumes that the racing occurred before a torque phase started as the differential value (dVSP) at time t1 is greater than the threshold value (dVSP1).

When a racing occurs before a torque phase starts (when the differential value dVSP is greater than the threshold value (dVSP1)), the control means 140 in step S250 increases the disconnecting hydraulic pressure in the next transmission. In other words, as shown in (D) of FIG. 5, if the disconnecting command value is Vo1 when a racing occurs, the control means 140 increases the disconnecting command value (for the next transmission) to Vo2 as indicated by the dotted line.

With this, the disconnecting hydraulic pressure Po1 at the occurrence of a racing goes up to Vo2 in the next transmission as indicated by the dotted line in (F) of FIG. 5. Consequently, occurrence of a racing is suppressed as indicated by the dotted line in (B) of FIG. 5.

The control means 140 calculates a disconnecting command value as explained below.

The control means 140 calculates the increment of the hydraulic command value from the fluid temperature, the throttle opening, or the input torque, and adds the increment to the initial disconnecting hydraulic pressure value for the next transmission. This hydraulic pressure value is converted to a duty value and output to the change-over solenoid valve 28a which is a duty solenoid valve.

It is also possible to directly obtain the initial disconnecting clutch duty by calculating the duty increment of the hydraulic command value from the fluid temperature, the throttle opening, or the input torque, adding the duty increment to the initial disconnecting clutch duty, and thus obtaining it (by the control means 140).

Referring to FIG. 6, below will be explained how the control means 140 controls in step S250 when a racing occurs after a torque phase starts.

In step S230, the means 120 for detecting a racing judges that a racing has occurred as the racing duration (dGear) exceeds the threshold value dGear1 at time t2 in example (B) of FIG. 6. In step S240, the means 130 for detecting a racing timing judges that the racing occurred after a torque phase started as the differential value (dVSP) at time t2 is smaller than the threshold value (dVSP1) as shown in (C) of FIG. 6.

In step S260, the control means 140 increases the connecting hydraulic pressure in the next transmission as the racing occurred after the torque phase started (when the differential value dVSP is smaller than the threshold value (dVSP1)). In other words, when the connecting command value at the occurrence of a racing is Vc1 (as seen in (E) of FIG. 6), the control means increases the connecting command value in the next transmission to Vc2 as indicated by the dotted line.

With this, the disconnecting hydraulic pressure Pc1 at the occurrence of a racing goes up to Vc2 in the next transmission as indicated by the dotted line in (G) of FIG. 6. Consequently, occurrence of a racing is suppressed as indicated by the dotted line in (B) of FIG. 6.

The control means 140 calculates a connecting command value as explained below.

The control means 140 calculates the increment of the hydraulic command value from the fluid temperature, the throttle opening, or the input torque, and adds the increment to the initial connecting hydraulic command value for the next transmission. This hydraulic pressure value is converted to a duty value and output to the change-over solenoid valve 28b which is a duty solenoid valve.

In other words, this embodiment prevents racings by checking whether it is before or after a torque phase started that a racing occurred and increasing the disconnecting hydraulic pressure when it is before a torque phase started or increasing the connecting hydraulic pressure when it is after a torque phase started.

For example, if the connecting hydraulic pressure is increased although a racing occurred before a torque phase started or if the disconnecting hydraulic pressure is increased although a racing occurred after a torque phase started, a pullback shock or transmission shock may be given to the driver.

However, if the connecting or disconnecting hydraulic pressure is switched properly according to the racing timing, power is transmitted smoothly without giving any shock to the driver.

Further, referring to FIG. 7, below will be explained how the control means 140 controls when no racing is detected in step S230.

As shown in (B) of FIG. 7, when no racing occurs (when the racing duration dGear is smaller than the threshold value (dGear1)), the control means 140 in step S270 decreases the disconnecting hydraulic pressure in the next transmission. In other words, as shown in (D) of FIG. 7, if the disconnecting command value is Vo1 when a racing occurs, the control means 140 decreases the disconnecting command value (for the next transmission) to Vo3.

With this, the disconnecting hydraulic pressure Po1 at the occurrence of a racing goes down to Vo3 in the next transmission as indicated by the dotted line in (F) of FIG. 7. Consequently, the disconnecting hydraulic pressure can be minimized. If the reduction in the disconnection hydraulic pressure causes a racing, the automatic transmission control unit can eliminate the racing by step S250 or S260.

The control means 140 calculates a disconnecting command value as explained below.

The control means 140 calculates the decrement of the hydraulic command value from the fluid temperature, the throttle opening, or the input torque, and subtracts the decrement from the initial disconnecting hydraulic pressure value for the next transmission. This hydraulic pressure value is converted to a duty value and output to the change-over solenoid valve 28a which is a duty solenoid valve.

It is also possible to directly obtain the initial disconnecting clutch duty by calculating the duty increment of the hydraulic command value from the fluid temperature, the throttle opening, or the input torque, subtracting the duty decrement from the initial disconnecting clutch duty, and thus obtaining it (by the control means 140).

In the above explanation, the initial value contain an increment or decrement of the hydraulic pressure in the next transmission, but it can be substituted by a gradient of the hydraulic pressure.

As explained above, this embodiment prevents racings and makes power transmission smooth and shockless by checking whether it is before or after a torque phase started that a racing occurred and increasing the disconnecting hydraulic pressure when it is before a torque phase started or increasing the connecting hydraulic pressure when it is after a torque phase started. Further, when a racing is not detected, the disconnecting hydraulic pressure can be reduced.

Referring to FIG. 8 through FIG. 11, below will be explained the second control operation of the automatic transmission control unit in accordance with this embodiment.

Figure 8:
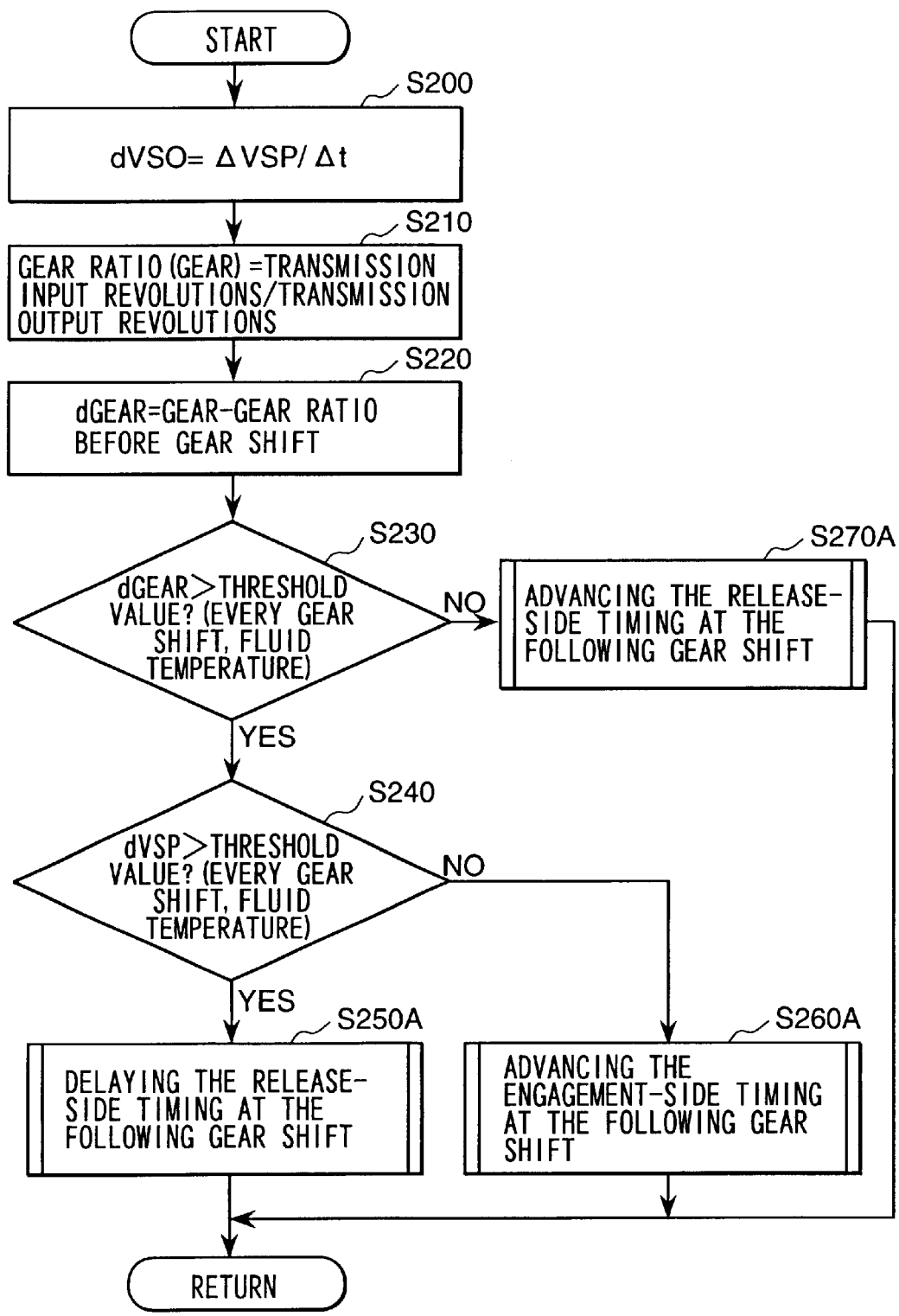
FIG. 8 is a second control flowchart of an automatic transmission control unit which is a first preferred embodiment of the present invention.
Figure 9:
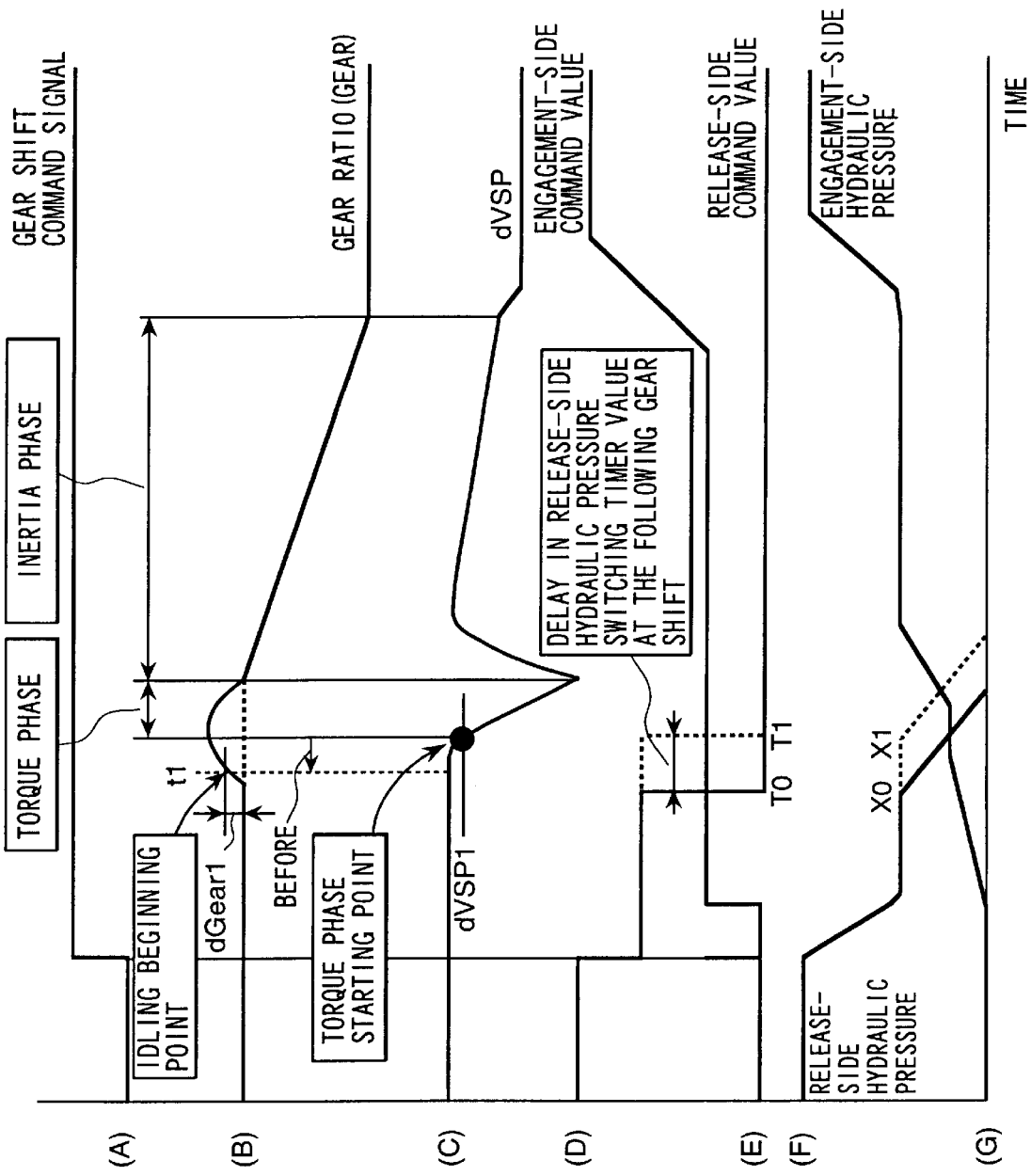
FIG. 9 is a timing chart indicating the control status of the automatic transmission control unit which is a first preferred embodiment of the present invention when a racing occurs before a torque phase starts.
Figure 10:
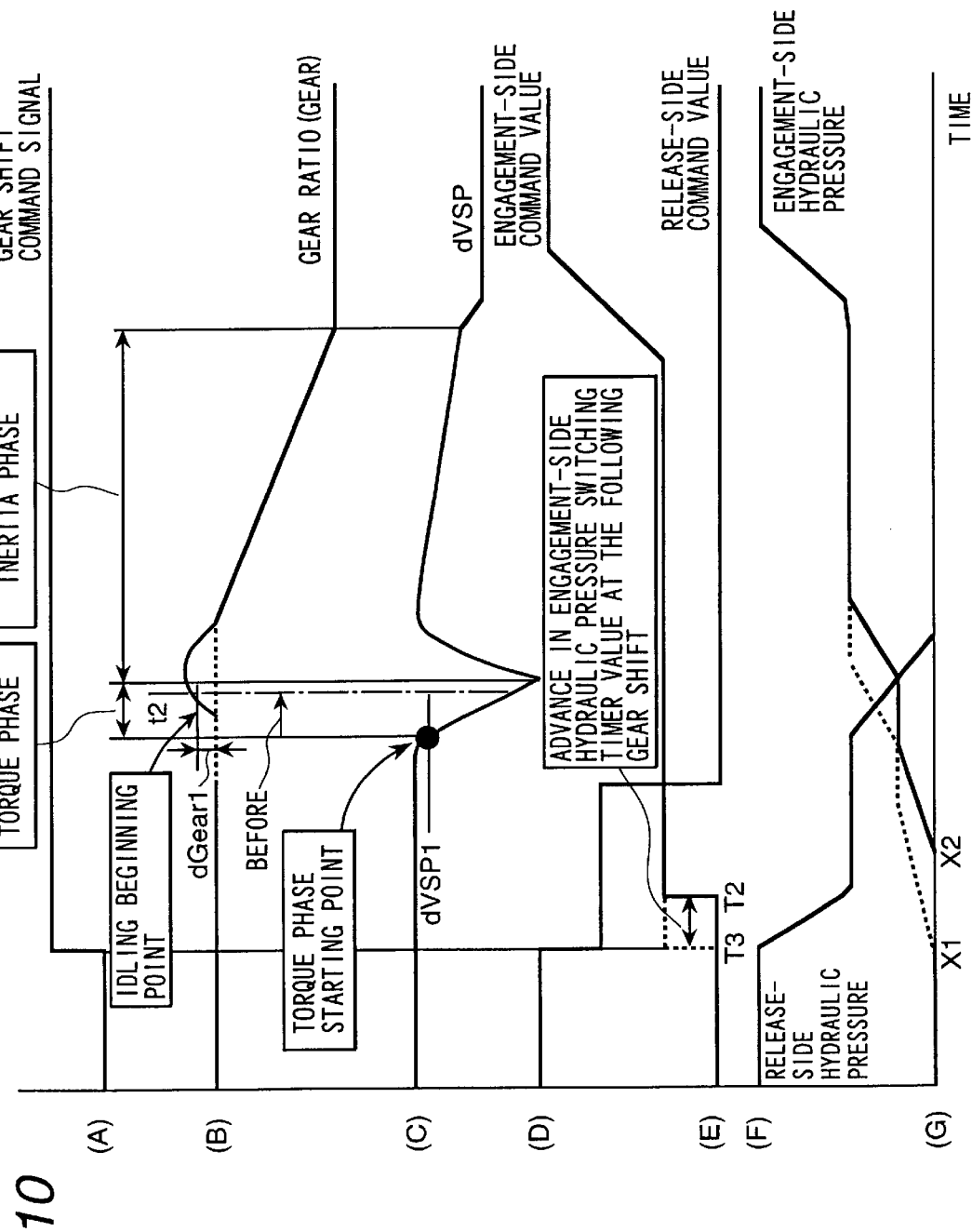
FIG. 10 is a timing chart indicating the control status of the automatic transmission control unit which is a first preferred embodiment of the present invention when a racing occurs after a torque phase starts.
Figure 11:
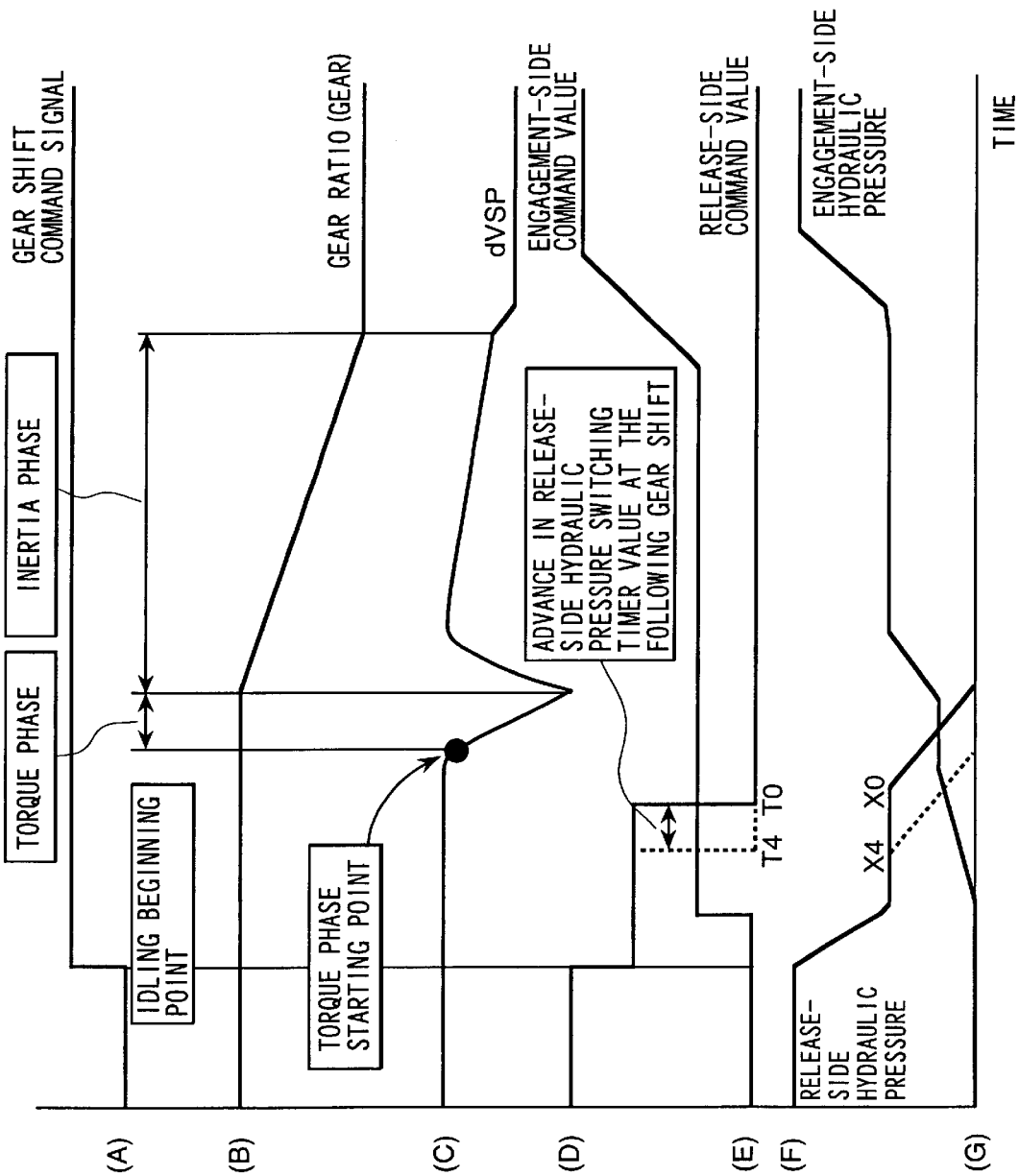
FIG. 11 is a timing chart indicating the control status of the automatic transmission control unit which is a first preferred embodiment of the present invention when a racing is not detected.

FIG. 8 is a flowchart showing a flow of the second control in the automatic transmission control unit in accordance with the present invention. FIG. 9 is a timing chart indicating the control status when the racing is detected before a torque phase starts. FIG. 10 is a timing chart indicating the control status when a racing is detected after a torque phase starts. FIG. 11 is a timing chart indicating the control status when no racing is detected. Items in FIG. 8 through FIG. 11 are identical to those in FIG. 4 through FIG. 7 when their numbers are identical.

In this example, steps S200 through S240 in FIG. 8 are functionally equal to steps S200 through S240 in FIG. 4. However, controls for cases that a racing is detected or not detected in this example is different from those in FIG. 4. In other words, the example in FIG. 4 increases or decreases the disconnecting or connecting hydraulic pressure but this example advances or delays the disconnecting or connecting timing.

When a racing occurs before a torque phase starts (when the differential value dVSP is greater than the threshold value (dVSP1)), the control means 140 in step S250A of FIG. 8 increases the disconnecting hydraulic pressure in the next transmission. In other words, as shown in (D) of FIG. 9, if the disconnecting timing is T0 when a racing occurs, the control means 140 delays the disconnecting timing (for the next transmission) to T2 as indicated by the dotted line.

With this, the disconnecting timing X0 at the occurrence of a racing is delayed to X1 in the next transmission as indicated by the dotted line. Consequently, occurrence of a racing is suppressed as indicated by the dotted line in (B) of FIG. 9.

The control means 140 calculates a disconnecting timing as explained below.

The control means 140 calculates the quantity of a timer delay from the fluid temperature, the throttle opening, or the input torque, and adds the quantity of delay to the present disconnecting timer value. This disconnecting timer value is used for the next transmission.

Referring to FIG. 10, below will be explained how the control means 140 in step S240 controls when a racing occurs after a torque phase starts.

In (B) of FIG. 10, the means 120 for detecting a racing judges that a racing occurred as the racing duration dGear is greater than the threshold value dGear1 at time t2 in step S230. In step S240, the means 130 for detecting a racing timing judges that a racing occurred after a torque phase started as the differential value (dVSP) at time t2 is smaller than the threshold value (dVSP1), as shown in (C) of FIG. 10.

In step S260A, the control means 140 advances the connecting timing in the next transmission as the racing occurs after the torque phase starts (as the differential value (dVSP) is smaller than the threshold value (dVSP1)). In other words, when the connecting timing at the occurrence of a racing is T2 as shown in (E) of FIG. 10, the control means 140 advances the next connecting timing to T3 as indicated by the dotted line.

Consequently, as shown in (G) of FIG. 10, the connecting timing X2 at the occurrence of a racing advances to T3 in the next transmission. As indicated by the dotted line in (B) of FIG. 10, the occurrence of a racing can be suppressed.

The control means 140 calculates the connecting timing as explained below.

The control means 140 calculates the quantity of a timer advance from the fluid temperature, the throttle opening, or the input torque, and subtracts the quantity of advance from the present connecting timer value. This connecting timer value is used for the next transmission.

Namely, this embodiment suppresses racings and makes power transmission smooth and shockless by checking whether it is before or after a torque phase started that a racing occurred and delaying the disconnecting timing when it is before a torque phase started or advancing the connecting timing when it is after a torque phase started.

Referring to FIG. 11, below will be explained how the control means 140 controls when no racing is detected in step S230.

If no racing occurs (if the racing duration (dGear) is smaller than the threshold value (dGear1)) as shown in (B) of FIG. 11, the control means 140 in step S270A advances the connecting timing in the next transmission. In other worse, when the disconnecting timing at the occurrence of a racing is X0 as shown in (D) of FIG. 11, the control means 140 advances the next disconnecting timing to X4 as indicated by the dotted line. With this, if a racing occurs, the automatic transmission control unit can eliminate the racing by step S250A or S260A.

The control means 140 calculates the disconnecting timing as explained below.

The control means 140 calculates the quantity of a timer advance from the fluid temperature, the throttle opening, or the input torque, and subtracts the quantity of advance from the present disconnecting timer value. This disconnecting timer value is used for the next transmission.

As explained above, this embodiment suppresses racings and makes power transmission smooth and shockless by checking whether it is before or after a torque phase started that a racing occurred and delaying the disconnecting timing when it is before a torque phase started or advancing the connecting timing when it is after a torque phase started. Further when a racing is not detected, the disconnecting timing can be advanced.

This embodiment uses increase/decrease of timer values and change of timing separately, but they can be used in combination.

This embodiment judges whether a racing has occurred according to unmatching of the disconnecting or connecting timing. If a disconnecting timing indicates the occurrence of a racing, the control means advances or delays the disconnecting timing to suppress the racing. If a racing does not occur, the control means delays the next disconnecting timing to make the engine a little race and controls the disconnecting timing so that a racing may be nearly caused at a feedback-controlled pressure.

If a racing has occurred by a connecting timing, the control means increases or advances the next connecting timing. This control can suppress racings, improve driveability, and protect the clutch against damages.

When detecting a racing, the present invention suppresses next and later racings without giving any shock to the driver.

What is claimed is:

1. An automatic transmission control unit for transmitting a driving power from an output shaft of an engine of an automobile to a transmission system through a friction member, controlling to disconnect and connect together said friction member, and controlling gear ratios of said automatic transmission, comprising means for detecting a starting point of a torque phase of said automatic transmission, means for detecting that the engine is racing, and control means for changing the disconnecting or connecting hydraulic pressure or timing in the next and later transmission according to whether a detected racing is before or after a detected torque phase starting point.

2. An automatic transmission control unit according to claim 1, wherein said control means increases the disconnecting hydraulic pressure in the next and later automatic transmission when the racing detected by said racing detecting means is before the torque phase starting point which is detected by said torque phase detecting means.

3. An automatic transmission control unit according to claim 1, wherein said control means increases the disconnecting hydraulic pressure in the next and later automatic transmission when the racing detected by said racing detecting means is after the torque phase starting point which is detected by said torque phase detecting means.

4. An automatic transmission control unit according to claim 1, wherein said control means delays the disconnecting timing in the next and later automatic transmission when the racing detected by said racing detecting means is before the torque phase starting point which is detected by said torque phase detecting means.

5. An automatic transmission control unit according to claim 1, wherein said control means advances the disconnecting timing in the next and later automatic transmission when the racing detected by said racing detecting means is after the torque phase starting point which is detected by said torque phase detecting means.

6. An automatic transmission control unit according to claim 1, wherein said control means reduces the disconnecting hydraulic pressure in the next and later automatic transmission when said racing detecting means does not detect a racing.

7. An automatic transmission control unit according to claim 1, wherein said control means advances the disconnecting timing in the next and later automatic transmission when said racing detecting means does not detect a racing.

* * * * *